Oct. 16, 1951  M. J. GROENENBERG  2,571,233
ADJUSTABLE MOUNT FOR CATHODE-RAY TUBE IN SCHMIDT PROJECTOR
Filed Feb. 17, 1949
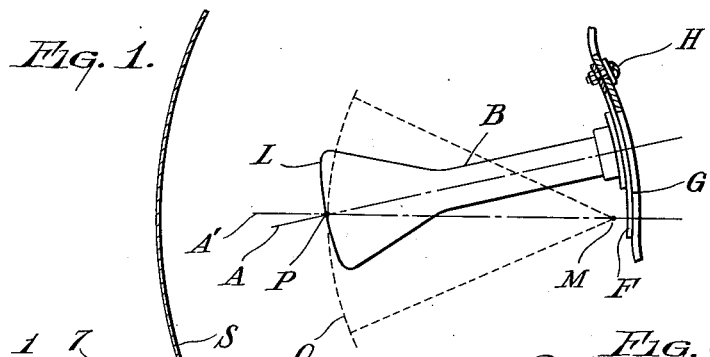
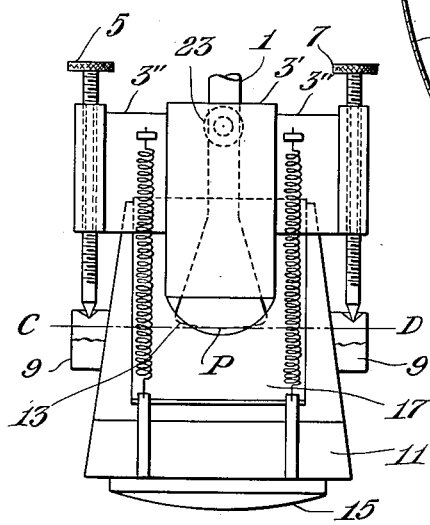
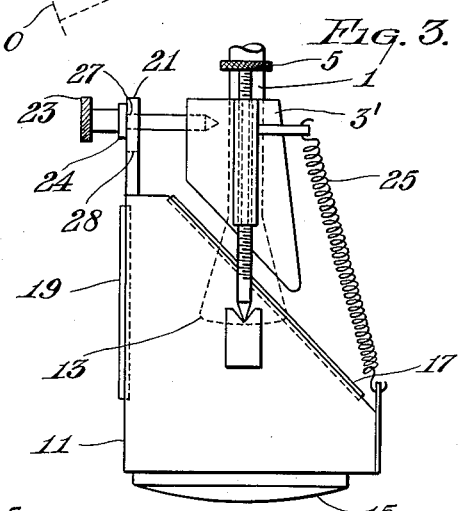
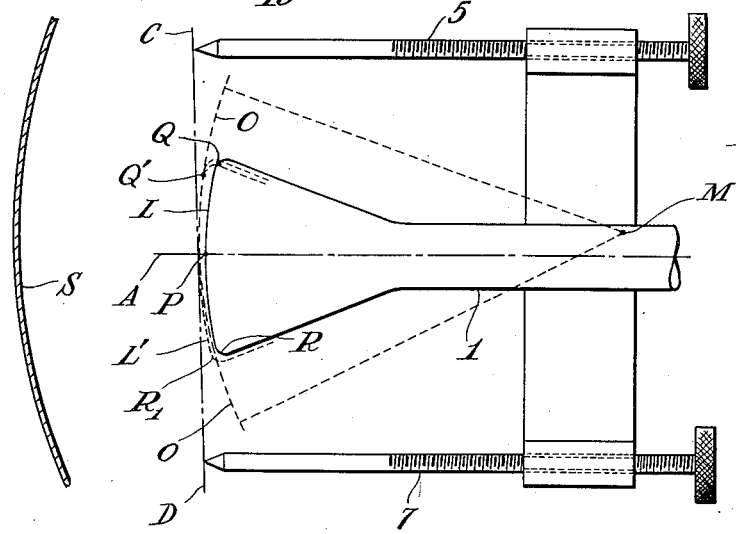
INVENTOR.
MAARTEN Jan GROENENBERG
BY
AGENT Patented Oct. 16, 1951

2,571,233

UNITED STATES PATENT OFFICE 2,571,233

ADJUSTABLE MOUNT FOR CATHODE-RAY TUBE IN SCHMIDT PROJECTOR

Maarten Jan Groenenberg, Eindhoven, Netherlands, assignor to Hartford National Bank and Trust Company, Hartford, Conn., as trustee Application February 17, 1949, Serial No. 77,004
In the Netherlands October 26, 1948

5 Claims. (Cl. 178—7.5)

This invention relates to a projection apparatus more particularly for television receivers of the projection type, with an optical system comprising a mirror and with a cathode-beam tube to constitute the image reproducer. In television receivers of the projection type the luminous screen of this tube, on which a television image of high intensity forms, is arranged in front of optical means, in the case under view of a concave mirror by which the image is enlarged and projected on to a screen.

In this apparatus, sharp adjustment of the projected image involves a difficulty which will be explained with reference to Fig. 1 of the accompanying drawing.

With a concave mirror the so-called object surface (the surface in which an object to be projected should lie in order to be sharply projected on a flat screen) is curved. With a spherical mirror (designated S in Fig. 1) the object surface O, in the area entering into account, is equally spherical at least to a sufficient degree of approximation. In connection herewith the luminous screen L of the cathode-beam tube B, on which the image to be projected appears, exhibits a curvature corresponding to that of the object surface O. In the case shown in the drawing the luminous screen L does not extend in the object surface O, since the axis A of the tube does not pass through the centre of curvature M of the object surface. However, the line of intersection of surfaces L and O extends in the object surface and the area (zone) of the image located along this line on the screen L is sharply projected, whereas the remainder of the image on the projection screen is blurred. To render this part equally sharp the tube must be tilted about a point (P) of the said line of intersection until the surfaces L and O coincide.

To this end, it is known to mount the tube B in such manner as to be tiltable about the centre of the luminous screen L, for instance by supporting the tube by means of a spherically curved plate F which is adapted to slide along a similarly curved stationary plate G and to be fixed in any desired position, within certains limits for example, by means of screws H passing through over-sized apertures.

In practice, however, this manner of adjustment proves to be quite unsatisfactory, since the zone sharply projected on the screen does not provide a simple indication of the direction in which the tube must be moved to render the whole image sharp. There is only one position in which this is true i. e. the position in which the axis A of tube B passes through the centre of curvature M of the object surface. In all interpositions only one zone of the image is sharp, which zone moves over the projection screen on moving the tube B.

The said zone remains sharp, whereas the remainder of the image remains blurred, unless the position is attained in which the image is sharp throughout.

Besides the axial device for sharp adjustment it is known to provide two adjusting devices which act at right angles to one another and to the axis of the tube, which permit the support (F in Fig. 1) of tube B to be shifted e. g. vertically and horizontally. By the horizontal adjusting device the axis A of the tube is brought vertically over the point M (discernible by the sharp zone being horizontal) the vertical adjusting device subsequently being readjusted until the axis A of the tube passes through point M (position A' characterized by sharpness of the whole image). For the sake of clearness the deviations have been exaggerated and the adjustment devices omitted in Fig. 1.

This permits to proceed systematically in focussing, so that this may easily be effected in a short time.

The present invention has for its object to secure this advantage by means of a simpler and cheaper device. According to the invention this is ensured by supporting the cathode-beam tube by means of a yoke or frame which is adapted to be shifted by means of two adjusting devices located diametrally with respect to the tube and operating substantially parallel with its axis the yoke or frame being tiltable about an axis extending in the proximity of the object surface by means of a third adjusting device. This construction is particularly suitable for a cheap and yet reliable realization. As will be explained hereinafter the directions for adjustment are a little less simple than in the known construction comprising adjusting devices at right angles to one another, it is true, but still sufficiently easy to permit adjustment by a technically skilled operator in a few minutes.

In order that the invention may be more fully explained and readily carried into effect, it will now be described more fully with reference to the accompanying drawing, given by way of example, in which Figs. 2 and 3 represent an embodiment thereof in two elevations, and Fig. 4 serves for explaining its operation.

Figs. 2 and 3 represent a projection device essentially consisting of a so-called Schmidt camera and a cathode-beam tube. The tube 1 is carried by a yoke or frame 3 consisting of a box shaped part 3' containing the deflection and focussing coils and being flanked by two plate-shaped parts 3". The ends of the yoke are slightly thickened and furnished with threaded bores which extend substantially parallel with the axis of the tube 1 and into which bolts 5 and 7 are screwed. The lower ends of these bolts rest in recesses of two blocks 9 secured at both sides of a box-shaped chassis 11 carrying the optical system. One of the cavities (in Fig. 2 on the left) is cup-shaped. The other recess may be shaped as a V-groove which extends in the direction of the line connecting the rest points of screw bolts 5 and 7, to permit small variations of the distance between the ends of the bolts.

The optical system comprises a concave mirror 15 arranged in front of the luminous screen 13 of the tube 1, a plane mirror 17 arranged at an angle of 45°, and a correction plate 19. The spherical mirror 15 and the correction plate 19 are normal parts of the Schmidt system, the mirror 17 serving for turning through 90° the direction of the rays reflected by the mirror 15. The reflected beam passes to the outside through the correction plate 19.

On top of the chassis 11 is mounted a support 21 which is provided with a bore 27 extending at right angles to the plane through the two bolts 5 and 7. Through this bore 27, which has an enlarged diameter at least in the vertical direction as indicated at 28, there passes a third set 23 which is screwed into the wall of the box 3' and rests with a collar on the support 21. Between the box 3' and the chassis two oblique tension springs 25 are provided which provide that the bolts 5 and 7 are constantly under pressure and the collar 24 of bolt 23 is constantly under tension strain against support 21, thus avoiding lateral play. As appears from the foregoing each of the bolts 5 and 7 permits the tube to be tilted in the plane of the drawing (Fig. 2) each time about the resting point of the other bolt, whereas the third adjusting bolt 23, with the vertical play possible due to enlarged diameter 28, permits tilting about the line C—D connecting the resting points (bearing points). This line is tangent to the object surface of the mirror 15.

Fig. 4 illustrates the adjusting operation and should be imagined to be a plan view in which the axis A of the cathode-beam tube 1 is approximately horizontal. The reference numerals partly correspond to those of Fig. 1 and partly to those of Figs. 2 and 3.

In order to focus the image one of the horizontal adjusting bolts, for example bolt 7, is turned until one of the extreme edges of the image, left or right on the projection screen, is sharp. This state is indicated in full lines in Fig. 4. In this event the point R of the luminous screen lies in the object surface O. Subsequently the other setbolt 5 is turned until the other side of the image (point Q of the screen L) is sharp (Q'). The initially sharp side (point R) has now become blurred (R'), the luminous screen L occupying the position L' shown in broken lines. From the drawing it appears that the present maximum deviation R—R' is smaller than the initial deviation Q—Q'. By turning the screw-bolt 7 the point R may be caused to resume its position, thus reducing the maximum deviation, and so forth. After repeatedly turning the two setscrews alternately the two points Q and R have been brought into the object surface 1 to a sufficient degree of accuracy, which appears from the fact that the two edges, and in addition the intermediate horizontal band passing through the centre of the image, are sharp.

In this event the axis A of the tube L extends right above point M. By turning the screw bolt 23 (Fig. 1) the axis A is tilted about the horizontal axis C—D, which is tangent to the luminous screen L at or near the centre P, until the first-mentioned axis passes through the point M. In this event the complete image is sharp.

It appears that after a little practice the aforesaid setting is just as easy as the setting by means of the known tilting devices with axial displacement operating at right angles to one another. In both devices the number of set screws is three, but the known device requires special construction to prevent interaction of the two mutually normal adjustments whereby the construction is rendered comparatively expensive.

From Figs. 2 and 3 it appears that the device according to the present invention has a very simple construction.

It is pointed out that the bearing points of the set bolts 5 and 7 should be located as close as possible to the luminous screen L. From Fig. 4 it appears that if the set bolts would pass through the points Q and R, each bolt need be adjusted only once. However, this is impracticable for structural reasons.

What I claim is:

1. In a projection apparatus for television receivers having an optical system which comprises a concave mirror and a cathode ray tube having a screen face as an image reproducer; a frame supporting said cathode ray tube, means tiltably supporting said frame at two points on a line disposed in a plane located substantially in that of said screen face, a pair of independently movable adjusting devices operatively associated with said means and acting on said frame at said points in directions approximately parallel to that of the axis of said tube, a third independently movable adjusting device for said frame, said third device positively acting on said frame substantially perpendicularly of the plane passing through said points at least in one direction, and resilient means biasing said frame in the opposite direction, whereby said frame is selectively tiltable about either of said points in substantially said plane by separate and sole operation of one or the other of said pair of adjusting means, respectively.

2. In a projection apparatus for television receivers having an optical system which comprises a concave mirror and a cathode ray tube having a screen face as an image reproducer; a frame supporting said cathode ray tube, means tiltably supporting said frame at two points on a line disposed in a plane located substantially in that of said screen face, a pair of independently movable adjusting devices operatively associated with said means and acting on said frame at said points in directions approximately parallel to that of the axis of said tube, a third independently movable adjusting device for said frame, said third device positively acting upon said frame substantially perpendicularly of the plane passing through said points at least in one direction, and resilient means biasing said frame in the opposite direction, a flat surface in fixed relation with respect to said means and said mirror and in substantially parallel relationship to said plane, said third device having a part thereof bearing on said flat surface whereby said frame is selectively tiltable about an imaginary axis extending through said two points by separate and sole operation of said third adjusting device, while the frame is also selectively tiltable about either of said points in substantially said plane by separate and sole operation of one or the other of said pair of adjusting means, respectively.

3. In a projection apparatus for television receivers having an optical system which comprises a concave mirror and a cathode ray tube as an image reproducer; a frame supporting said cathode ray tube, a pair of independently movable adjusting devices mounted on said frame, each device comprising a screw bolt threaded in said frame and extending in substantially the same direction as does the axis of said tube, chassis means apart from said frame, said chassis means comprising separate recesses in which each of said bolts abut, said chassis means also being a fixed mounting for said mirror, a third independently movable adjusting device for said frame, said third device comprising a screw bolt extending substantially perpendicularly of the plane passing through said points and extending in the direction in which said pair of bolts extend and into said frame, a lateral surface mounted on said chassis and in substantially parallel relationship to said plane, said bolt of which said third device is comprised having a part thereof engaging said surface, and resilient means biasing said frame in the opposite direction whereby said frame is selectively tiltable about an imaginary axis extending through said two points by separate and sole operation of said third adjusting device, while the frame is also selectively tiltable about either of said points in substantially said plane by separate and sole operation of one or the other of said pair of adjusting means, respectively.

4. In a projection apparatus for television receivers having an optical system which comprises a concave mirror and a cathode ray tube as an image reproducer; a frame supporting said cathode ray tube, a pair of independently movable adjusting devices mounted on said frame, each device comprising a screw bolt threaded in said frame and extending in substantially the same direction as does the axis of said tube, chassis means apart from said frame, said chassis means comprising separate recesses in which each of said bolts abut, said chassis means also being a fixed mounting for said mirror, a third independently movable adjusting device for said frame, said third device comprising a screw bolt extending substantially perpendicularly of the plane passing through said points and extending in the direction in which said pair of bolts extend and into said frame, a lateral surface mounted on said chassis and in substantially parallel relationship to said plane, said bolt of which said third device is comprised having a part thereof engaging said surface, and spring means attached to said chassis means and to said frame and arranged at an acute angle with respect to said plane on the other side thereof with respect to said bolt of said third device, whereby said frame is selectively tiltable about an imaginary axis extending through said two points by separate and sole operation of said third adjusting device, while the frame is also selectively tiltable about either of said points in substantially said plane by separate and sole operation of solely one or the other of said pair of adjusting means, respectively, and all three adjusting devices are under spring tension so as to avoid play.

5. For use in a projection apparatus for television receivers having an optical system which comprises a concave mirror and a cathode ray tube as an image reproducer; a frame adapted to support a cathode ray tube, a pair of independently movable adjusting devices mounted on said frame and extending in substantially the same direction therefrom, chassis means adapted to support a concave mirror, said chassis means being apart from said frame and having means supported thereon against which each of said adjusting devices abut at a separate point located thereon, a third independently movable adjusting device for said frame, said third device extending substantially perpendicularly of the plane passing through said points and extending in the direction in which said pair of adjusting devices extend and into said frame, and spring means biasing said frame in the opposite direction from that in which said third adjusting device operates whereby said frame is selectively tiltable about an imaginary axis extending through said two points by separate and sole operation of said third adjusting device, while the frame is also selectively tiltable about either of said points in substantially said plane by separate and sole operation of solely one or the other of said pair of adjusting means, respectively.

MAARTEN JAN GROENENBERG.

REFERENCES CITED

The following references are of record in the file of this patent:

UNITED STATES PATENTS

| Number | Name | Date |
|---|---|---|
| 1,535,218 | Everett | Apr. 28, 1925 |
| 1,667,380 | Handlan | Apr. 24, 1928 |
| 2,065,735 | Preddey | Dec. 29, 1936 |
| 2,424,513 | Stephan | July 22, 1947 |
| 2,455,476 | Epstein | Dec. 7, 1948 |

OTHER REFERENCES

Electronics, April 1948, pages 73, 74 and 75.